United States Patent
Lo

(10) Patent No.: US 8,262,786 B2
(45) Date of Patent: Sep. 11, 2012

(54) COMBUSTIBLE ENERGY FILTERING AND RECYCLING SYSTEM

(75) Inventor: Huan-Ho Lo, Taoyuan County (TW)

(73) Assignee: Hung Chih Corporation Limited, Taoyuan County (TW)

( * ) Notice: Subject to any disclaimer, the term of this patent is extended or adjusted under 35 U.S.C. 154(b) by 588 days.

(21) Appl. No.: 12/585,415

(22) Filed: Sep. 15, 2009

(65) Prior Publication Data

US 2011/0061541 A1    Mar. 17, 2011

(30) Foreign Application Priority Data

Jun. 23, 2009 (TW) ................................ 98120982 A

(51) Int. Cl.
*B01D 47/10* (2006.01)

(52) U.S. Cl. ............... 96/240; 96/262; 96/265; 96/275; 96/276; 96/323; 95/216; 261/DIG. 54

(58) Field of Classification Search .................. None
See application file for complete search history.

(56) References Cited

U.S. PATENT DOCUMENTS

| | | | | |
|---|---|---|---|---|
| 1,557,399 A * | 10/1925 | Bancel | ........................ | 261/116 |
| 2,337,983 A * | 12/1943 | Fisher | ........................ | 261/3 |
| 3,112,352 A * | 11/1963 | Krantz | ........................ | 261/36.1 |
| 3,369,344 A * | 2/1968 | Jackson et al. | ........................ | 95/14 |
| 3,624,696 A * | 11/1971 | Cohen et al. | ........................ | 96/280 |
| 3,793,809 A * | 2/1974 | Tomany et al. | ........................ | 95/211 |
| 3,794,306 A * | 2/1974 | Engalitcheff, Jr. | ........................ | 261/116 |
| 3,827,216 A * | 8/1974 | Mare | ........................ | 95/226 |
| 4,046,867 A * | 9/1977 | Seeling et al. | ........................ | 423/543 |
| 4,312,646 A * | 1/1982 | Fattinger et al. | ........................ | 96/239 |
| 6,485,548 B1 * | 11/2002 | Hogan | ........................ | 96/282 |
| 6,805,734 B1 * | 10/2004 | Lilja et al. | ........................ | 96/273 |
| 2006/0075897 A1 * | 4/2006 | Rikihisa | ........................ | 96/271 |

* cited by examiner

*Primary Examiner* — Duane Smith
*Assistant Examiner* — Pankti Patel
(74) *Attorney, Agent, or Firm* — Bacon & Thomas, PLLC

(57) ABSTRACT

A combustible energy filtering and recycling system includes a filtering tank, a gas exhaust vent, an overflow vent, and a water-collection chamber. A Venturi gas filter pipe is fixed to the filtering tank and connected with a gas intake pipe which is used for introducing a combustible gas into the gas filter pipe. A first end of the gas filter pipe is connected to a water intake pipe, such that the cooling water can be flowed through the gas filter pipe and collected at the water-collection chamber, and thus dusts and impurities in the combustible gas can be submerged into the cooling water due to the effects of pressure accumulation, air acceleration and pressure reboost produced by the gas filter pipe and the inertia effect. The combustible gas insoluble in water will then be introduced into the gas exhaust vent, so that manufacturers can recycle a high-quality and pollution-free combustible gas.

9 Claims, 3 Drawing Sheets

COMBUSTIBLE ENERGY FILTERING AND RECYCLING SYSTEM

FIELD OF THE INVENTION

The present invention relates to a filtering and recycling system, in particular to a filtering and recycling system using the Venturi principle and inertia effect to filter dusts and impurities in a combustible gas to obtain a high-quality recycled combustible gas.

BACKGROUND OF THE INVENTION

As high-tech industries advance rapidly, countries of the world have increasingly larger demands for energy sources, and petroleum in the world has been explored and used extensively, and thus the petroleum storage becomes less and less. Besides the decreasing storage of petroleum, research institutes also point out that resources including natural gases and coals may be exhausted within a century, and thus "energy shortage" has become one of the major issues of the world that demands immediate attentions and solutions.

To overcome the energy shortage issue, related manufacturers have conducted research and development of new energy sources, and increasingly more devices of new energy sources including solar energy, wind power and hydro power are designed, but the portion of renewable energy has been neglected. In many countries, over million tons of waste substances are produced yearly, and the waste substances are either buried or incinerated. In general, moisture contained in the waste substances is evaporated into water vapor ($H_2O$), in addition to a large amount of carbon dioxide ($CO_2$) and carbon (C), after the waste substances are combusted. When carbon dioxide and carbon produce an endothermic reaction, then carbon monoxide (CO) will be produced. Further, when water vapor and carbon produce an ethothermic reaction, then carbon monoxide and hydrogen ($H_2$) will be produced, and carbon monoxide and hydrogen are combustible gases that can be collected and transmitted to a combustion power generation organization for being used as a substitute fuel to generate electric power. Some manufacturers have foreseen the huge energy source, market and profit brought by the combustible gases produced in the combustion of the waste substances and designed various different energy recycle vaporization systems, so that the waste substance in a vaporization system will not be combusted completely (which is a smoldering combustion), and will produce a large amount of combustible gas by utilizing the repeated endothermic and exothermic reactions occurred therein.

Since dusts and impurities are produced after the waste substances have gone through the combustion in the energy recycle vaporization system, and the dusts and impurities cannot be combusted completely and generally come with a small size and a light weight. Therefore, the dusts and impurities will be floated and drifted by a rising air current produced during the combustion and mixed into the combustible gas. When manufacturers recycle the combustible gas produced after the waste substances are combusted, the dusts and impurities contained in the combustible gas will be recycled together. When the manufacturers adopt a general filter net for filtering the recycled combustible gas, only larger impurities with a sheet shape can be collected, but the large sheet-shaped impurities will be cracked and broken into smaller pieces easily after the impurities are blocked and collected. When the manufacturers use a filter net with smaller meshes, the impurities will clog the meshes of the filter net and makes the combustible gas difficult to pass through the meshes of the filter net. Furthermore, the filter net may be oxidized, damdeteriorated, or become brittle more quickly due to a high temperature produced during the combustion. When the combustible gas contains more non-combustible dusts and impurities, the quality of the combustible gas will be poor, so that when the combustible gas is used for the combustion again, the expected quality of energy cannot be obtained, and the combustion performance provided by the recycled combustible gas will be affected significantly, or even a serious air pollution will result. Besides the aforementioned problems, the timing for the manufacturers to recycle the combustible gas is usually at the time after the waste substance has gone through the smoldering combustion in the energy recycle vaporization system and recycled directly from the energy recycle vaporization system. Then, the combustible gas with a high temperature will be flushed into a recycle device, so that the recycle device may be damdeteriorated or related components may be deteriorated easily in the high temperature environment for a long time, and thus the manufacturer's production and maintenance costs remain very high.

Therefore, related recycle energy system manufacturers spare no effort to provide feasible solutions for filtering the impurities in the combustible gas and lowering the temperature to improve the quality of the combustible gas and extend the using life of the recycle devices in order to gain better competitiveness in the energy market by means of the high-quality combustible gas. It is an important subject for recycle energy system designers and manufacturers to design a novel filtering and recycling system for filtering the dusts and impurities existing in the combustible gas, as so to achieve the effects of cooling and collecting high quality and pollution-free combustible gas.

SUMMARY OF THE INVENTION

In view of the shortcomings of a combustible gas containing dusts and impurities that will affect the combustion of the combustible gas, the utilization of the combustible gas, and the market competitiveness of the manufacturers significantly, the inventor of the present invention based on years of experience in the related industry to conduct extensive researches and experiments, and finally developed a combustible energy filtering and recycling system in accordance with the present invention to overcome the aforementioned shortcomings.

Therefore, it is a primary objective of the present invention to provide a combustible energy filtering and recycling system capable of filtering and removing dusts and impurities in a combustible gas effectively to obtain a high-quality combustible gas, wherein the filtering and recycling system comprises a filtering tank and a gas filter pipe with a Venturi tube structure, wherein the filtering tank includes a containing space for accommodating the gas filter pipe, and the filtering tank includes a gas exhaust vent disposed at an internal periphery proximate to the top of the filtering tank, and an overflow vent disposed at an internal periphery proximate to the bottom of the filtering tank, such that a water-collection chamber is formed between the bottom of the filtering tank and the overflow vent, and a first end of the gas filter pipe is fixed to the top in the filtering tank and connected to a water intake pipe, and a second end of the gas filter pipe is extended towards the bottom in the filtering tank and to the position of the overflow vent, such that the cooling water introduced into the water intake pipe can be sprayed from the first end of the gas filter pipe to the second end of the gas filter pipe and collected into the water-collection chamber. After the combustible gas is introduced from the first end of the gas filter pipe, the cooling water introduced by the water intake pipe will cool down the combustible gas and moisten the dusts and impurities to increase the weight of the dusts and impurities, such that the combustible gas and the moistened dusts and impurities passed through the gas filter pipe will be affected by the Venturi principle to have the effects of pressure accumulation, air acceleration and pressure reboost, and then pass through a gap between the opening of the second end of the gas filter pipe and the level of cooling water collected by the water-collection chamber, such that the moistened dusts and impurities will be submerged into the cooling water of the water-collection chamber due to the acceleration and inertia effects. On the other hand, since the combustible gas is insoluble in water and guided out of the gas filter pipe, the combustible gas is able to pass through the gas exhaust vent and be recycled, so that manufacturers can separate the dusts and impurities from the combustible gas quickly to obtain a better-quality combustible gas. Another objective of the present invention is to provide a filtering and recycling system with no complicated components or structures and use the Venturi principle to change the flow rate of the gas, wherein since the combustible gas is insoluble in water, the dusts and impurities can be separated from the combustible gas. In addition, since the cooling water guided into the gas filter pipe is able to moisten the dusts and impurities, and increase the weight of the dusts and impurities, it not only effectively improves the inertia effect of the dusts and impurities, but also lowers the temperature inside the filtering tank effectively, extends the using life of the filtering and recycling system, and prevents the components from being deteriorated earlier by the high temperature.

A further objective of the present invention is to provide a filtering and recycling system further comprising a water storage tank and a motor device, wherein the water storage tank is interconnected with an overflow vent of the filtering tank, such that after the cooling water in the water-collection chamber flows through the overflow vent, the cooling water can be stored in the water storage tank, and the motor device can extract the cooling water out from the water storage tank and transmit the cooling water to the water pipe again, and the cooling water can be used repeatedly in order to reduce a waste of the water resource. When manufacturers uses the cooling water repeatedly, the cooling water is passed through a purifier to remove all impurities contained in the cooling water, so as to prevent reducing the performance of the cooling water to moisten the dusts and impurities.

DETAILED DESCRIPTION OF THE PREFERRED EMBODIMENTS

Figure 1:
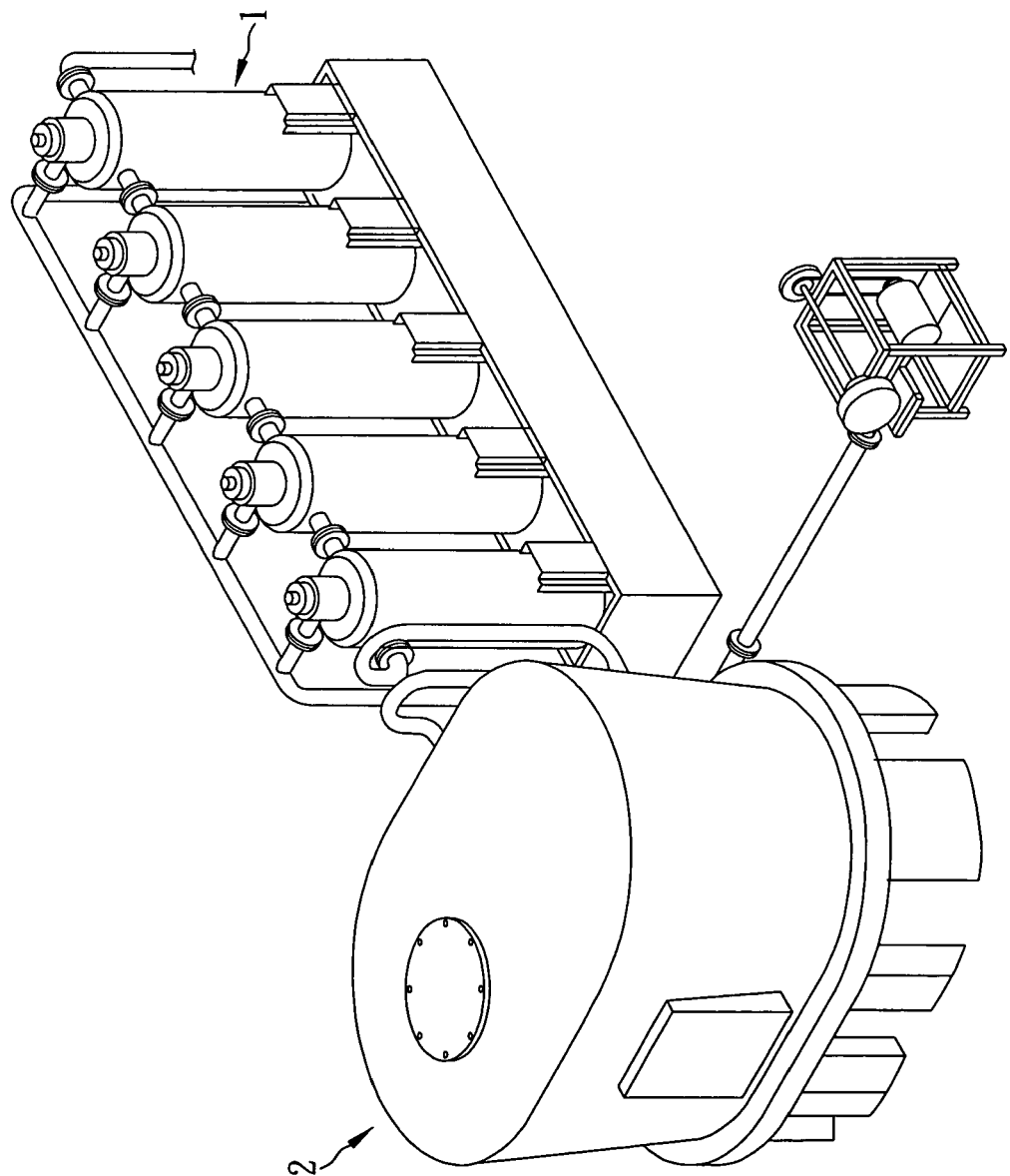
FIG. 1 is a schematic view showing a connection of a filtering and recycling system with an energy recycle vaporization system in accordance with the present invention.

Since dusts and impurities produced after burning a waste substance (in a smoldering combustion) comes with a small volume and a light weight, the dusts and impurities will flow with air current, and it is necessary to increase the weight of the dusts and impurities, such that the dusts and impurities can be separated from the combustible gas. At present, manufacturers generally spray cooling water onto the housing of a high-temperature device to cool the high-temperature device, so that the high heat generated by the device can be absorbed by the cooling water. The inventor of the present invention made use of the cooling water to absorb heat and moisten the dusts and impurities to increase the weight of the dusts and impurities, and developed a combustible energy filtering and recycling system in accordance with the present invention. With reference to FIG. 1 showing a schematic view of a connection of a filtering and recycling system 1 with an energy recycle vaporization system 2 in accordance with the present invention, after a waste substance is burned (in a smoldering combustion) in the energy recycle vaporization system 2, a combustible gas produced will be transmitted into the first filtering and recycling system 1. After cooling and filtering processes, the waste substance is transmitted into a second filtering and recycling system 1 for the cooling and filtering again, so that manufacturers can obtain a high-quality and pollution-free combustible energy. However, manufacturers generally use one filtering and recycling system 1 only due to the cost consideration and different market requirements.

Figure 2:
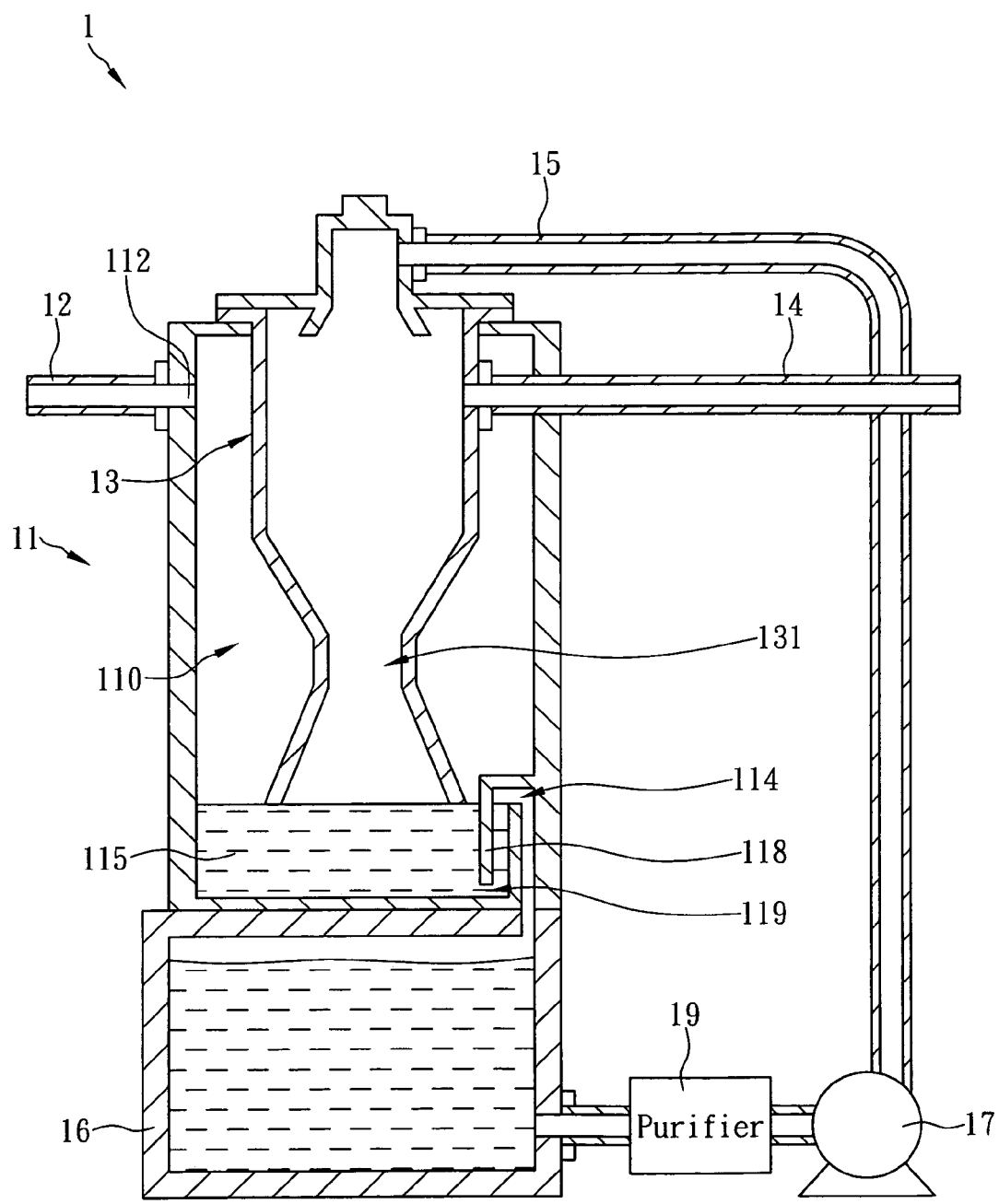
FIG. 2 is a schematic view of a filtering and recycling system in accordance with a preferred embodiment of the present invention.

The overall technical characteristics of a filtering and recycling system in accordance with the present invention are fully disclosed as follows. With reference to FIG. 2 showing a schematic view of a filtering and recycling system in accordance with a preferred embodiment of the present invention, the filtering and recycling system 1 comprises a filtering tank 11 and a gas filter pipe 13, wherein the filtering tank 11 includes a containing space 110 for accommodating the gas filter pipe 13 and related components, and providing sufficient space for the combustible gas to complete its filtering procedure, and the filtering tank 11 includes a gas exhaust vent 112 disposed at the internal periphery proximate to the top of the filtering tank 11 and connected to a gas discharge pipe 12 for guiding the filtered combustible gas out from the filtering tank 11 for recycling as shown in FIG. 1, and manufacturers can connect the gas discharge pipe 12 with a gas intake pipe of another filtering and recycling system for performing a second filtering and recycling procedure in order to improve the quality of the combustible gas or directly collecting the combustible gas transmitted by the gas discharge pipe 12. In addition, the filtering tank 11 includes an overflow vent 114 disposed at the periphery proximate to the bottom of the filtering tank 11, such that a water-collection chamber 115 is formed between the bottom of the filtering tank 11 and the overflow vent 114. When the water-collection chamber 115 starts accumulating liquid, liquid can be stored up to the level of the position of the overflow vent 114, and any water exceeding the level will flow out of the filtering tank 11 through the overflow vent 114. The gas filter pipe 13 includes a Venturi tube structure disposed on an internal wall of the gas filter pipe 13. In other words, the internal pipe diameter at both ends of the gas filter pipe 13 is greater than the internal pipe diameter at the middle section of the gas filter pipe 13. For simplicity, the position of the gas filter pipe 13 having the smallest internal pipe diameter is called a throat position 131. Theoretically, the volume of air flowing through each cross-section of the gas filter pipe 13 in a same unit time is equal. Since the cross-sectional area of a first end of the gas filter pipe 13 is significantly larger than the cross-sectional area of a gas intake pipe 14 for guiding the combustible gas into the first end of the gas filter pipe 13, therefore the air flow speed at the first end of the gas filter pipe 13 suddenly becomes very slow, and the density and static pressure of the gas at this end of the gas filter pipe 13 suddenly becomes very great, so as to produce a pressure accumulation effect. However, since the cross-sectional area at the throat position 131 is smaller than the cross-sectional area at the first end of the gas filter pipe 13, the air flow speed at the throat position 131 is greater than the air flow speed at the first end of the gas filter pipe 13, and the density and static pressure of the gas at the throat position 131 are smaller than the density and static pressure of the gas at the first end of the gas filter pipe 13, such that when the gas flows through the throat position 131 to a second end of the gas filter pipe 13, the air flow speed again becomes smaller, and the air density and static pressure of the gas again become greater due to the larger cross-sectional area at the second end of the gas filter pipe 13, so as to perform a pressure accumulation for another time. During the changes of gas properties from the first end of the gas filter pipe 13 to the second end thereof, the effects of pressure accumulation, air acceleration and pressure reboost take place sequentially.

Figure 3:
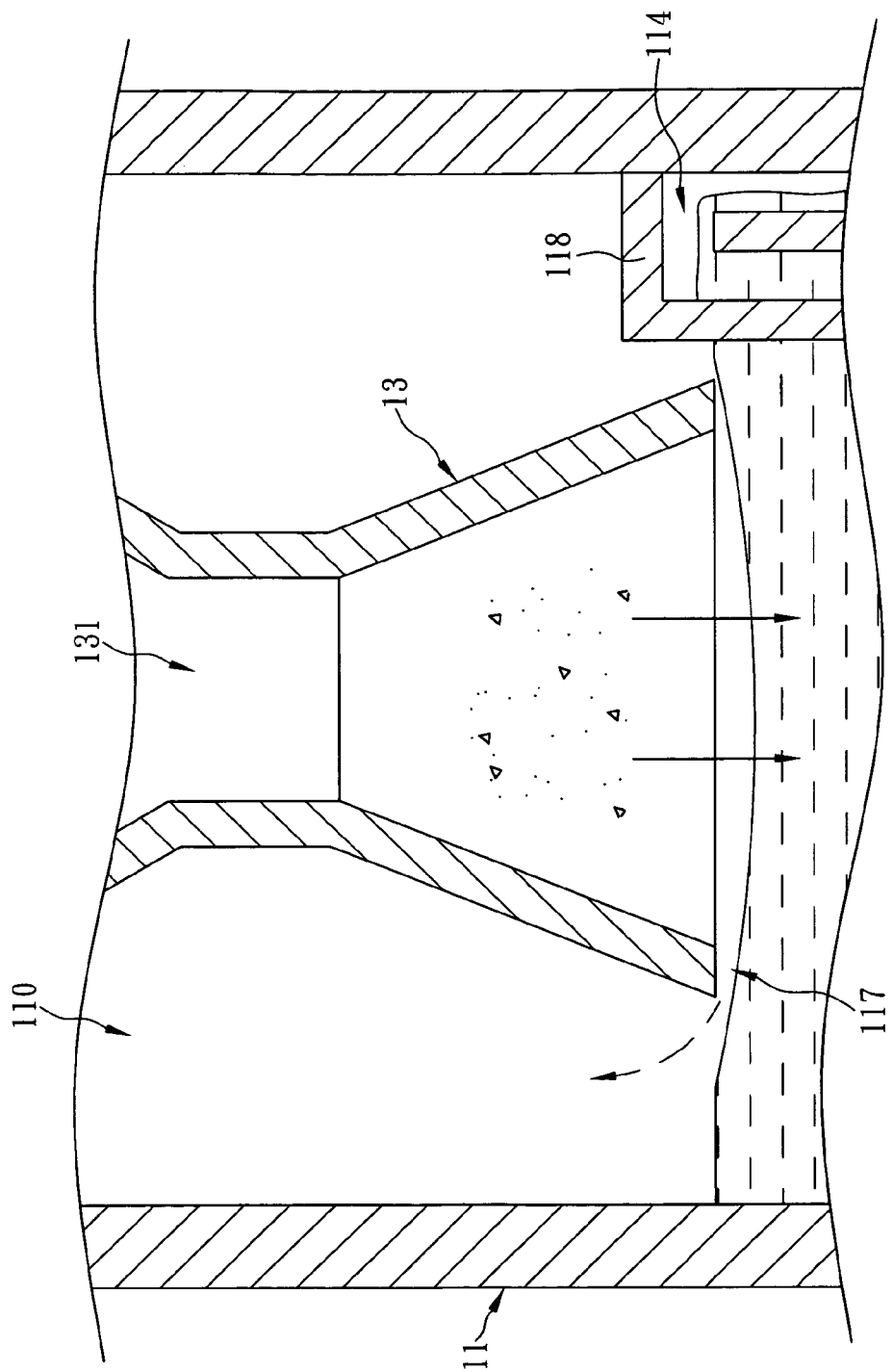
FIG. 3 is a schematic view of a filtering and recycling system having a gas filter pipe with a pressure greater than a pressure at the level of cooling water in accordance with the present invention.

In FIG. 2, the first end of the gas filter pipe 13 is fixed to the top inside the filtering tank 11, and a predetermined interval is maintained between the periphery of the gas filter pipe 13 and the periphery inside the filtering tank 11, and the second end of the gas filter pipe 13 is extended towards the bottom of the filtering tank 11 and to the position of the overflow vent 114. In addition, the periphery of the gas filter pipe 13 proximate to the first end thereof is connected with the gas intake pipe 14, such that the combustible gas produced by an energy recycle vaporization system 2 (as shown in FIG. 1) can be guided into the gas filter pipe 13 through the gas intake pipe 14, and an opening of the first end of the gas filter pipe 13 is connected to a water intake pipe 15, such that the cooling water introduced into the water intake pipe 15 can be sprayed from the first end of the gas filter pipe 13 towards the second end thereof, and collected in the water-collection chamber 115. When the cooling water flows through the gas filter pipe 13, the heat of the combustible gas will be absorbed to achieve a cooling effect, such that the components of the filtering tank 11 will not become deteriorated or brittle earlier due to the high temperature, so as to extend the using life of the filtering tank 11, and lower the manufacturer's maintenance cost effectively. In addition, the cooling water can moisten the dusts and impurities mixed in the combustible gas to increase the weight of the dusts and impurities, such that when the level of cooling water stored in the water-collection chamber 115 rises to the position of the overflow vent 114, an opening of the second end of the gas filter pipe 13 will be blocked as shown in FIGS. 2 and 3. Since the cooling water is continuously introduced from the water intake pipe 15 into the gas filter pipe 13, therefore, the combustible gas in the gas filter pipe 13 cannot be guided out of the gas filter pipe 13 through the water intake pipe 15 and it flows towards the second end of the gas filter pipe 13 accordingly. However, since the second end of the gas filter pipe 13 is blocked by the level of the cooling water, and the combustible gas is insoluble in water, so that the pressure of the combustible gas in the gas filter pipe 13 increases gradually. When the pressure of the combustible gas at the second end of the gas filter pipe 13 is accumulated to an extent capable of overcoming the pressure at the level of the cooling water, then the cooling water will be forced to flow through the overflow vent 114, and the level of the cooling water shifts towards the bottom of the filtering tank 11, and a gap 117 is produced between the opening of the second end of the gas filter pipe 13 and the level of the cooling water, so that the combustible gas can be guided out of the gas filter pipe 13 (as indicated by the dotted arrowhead in FIG. 3) through the gap 117. When the moistened dusts and impurities flow through the throat position 131, the speed of the moistened dusts and impurities increases due to the fast gas flow rate. Since the weight of the moistened dusts and impurities is greater, it is not easy to change the original inertia status (i.e. shifting towards the bottom of the filtering tank 11), so that the moistened dusts and impurities will not easily be affected by the flowing direction of the combustible gas. The dusts and impurities are maintained the original moving direction and submerged into the cooling water of the water-collection chamber 115 (as indicated by the solid arrowhead in FIG. 3). Therefore, the dusts and impurities mixed in the combustible gas can be separated from the combustible gas effectively, and the filtered combustible gas can be passed through a predetermined interval between the gas filter pipe 13 and the filtering tank 11, and the gas exhaust vent 112 disposed in the filtering tank 11 proximate to the top inside the filtering tank 11 is provided for manufacturers to perform a next processing procedure (such as directly recycling the combustible gas or introducing the combustible gas into another filtering and recycling system for a second filter, etc), so that manufacturers can use the filtering and recycling system of the present invention to obtain a high-quality and pollution-free combustible gas to improve the competitiveness of the manufacturers in the energy market.

In FIG. 2, the filtering tank 11 further includes a stop portion 118 disposed at a position proximate to the overflow vent 114, and an end of the stop portion 118 is fixed onto the filtering tank 11, and another end of the stop portion 118 is extended towards the bottom of the filtering tank 11, and maintained an interval 119 from the bottom of the filtering tank 11. Since there is a distance between the interval 119 and the level of the cooling water, the combustible gas will not be guided out of the filtering tank 11 through the overflow vent 114 to avoid the difficulty of recycling the combustible gas. The filtering and recycling system 1 further comprises a water storage tank 16 connected with the overflow vent 114, such that the cooling water in the water-collection chamber 115 can flow into the water storage tank 16 through the overflow vent 114, and a motor device 17 for pumping the cooling water from the water storage tank 16 into the water intake pipe 15 to repeat using the cooling water and avoid a waste of water resources. In addition, a purifier 19 can be installed between the overflow vent 114 and the water storage tank 16, or between the motor device 17 and the water storage tank 16, or between the motor device 17 and the gas filter pipe 13, for removing the impurities in the cooling water, such that the performance of the cooling water for moistening the dusts and impurities will not be affected. In this preferred embodiment, the water storage tank 16 is installed under the filtering tank 11. However, the water storage tank 16 can be installed in any position, as long as the cooling water in the water-collection chamber 115 can be flowed from the overflow vent 114 into the water storage tank 16 in accordance with other preferred embodiments of the present invention. In this preferred embodiment, the level of the cooling water blocks the opening of the second end of the gas filter pipe 13, but the level of the cooling water can be slightly lower than the opening of the second end of the gas filter pipe 13 (which means that the position of the overflow vent 114 is slightly lower than the opening of the second end of the gas filter pipe 13) or slightly higher than the opening of the second end of the gas filter pipe 13 (which means that the position of the overflow vent 114 is slightly higher than the opening of the second end of the gas filter pipe 13) in practical applications, instead of precisely at the opening of the second end of the gas filter pipe 13 only. In addition, the gas intake pipe 14 of the present invention can be connected directly to the first end of the gas filter pipe 13 instead of being limited to the position proximate to the first end of the gas filter pipe 13 only, and those skilled in the art can make numerous modifications to the structure and elements of the present invention based on the technical characteristics of the present invention, While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A combustible energy filtering and recycling system, comprising:
   a filtering tank, including a containing space therein, a gas exhaust vent disposed in the filtering tank and at an edge proximate to the top of the filtering tank, an overflow vent disposed in the filtering tank and at an edge proximate to the bottom of the filtering tank, and a water-collection chamber formed between the bottom of the filtering tank and the overflow vent; and
   a gas filter pipe, with a Venturi tube structure, and having a first end fixed to the top inside the filtering tank, and a second end extended towards the bottom of the filtering tank and to a position of the overflow vent, and the gas filter pipe being interconnected with a gas intake pipe, and the gas intake pipe being used for introducing a combustible gas into the first end of the gas filter pipe, and an opening of the first end of the gas filter pipe being connected to a water intake pipe, and the water intake pipe being used for introducing a cooling water into the gas filter pipe, such that the cooling water can be passed through an opening of the second end of the gas filter pipe and collected into the water-collection chamber.

2. The filtering and recycling system of claim 1, wherein a periphery of the gas filter pipe is distanced from a periphery of the filtering tank by a predetermined interval.

3. The filtering and recycling system of claim 2, wherein the opening of the second end of the gas filter pipe is disposed at a horizontal position of the overflow vent.

4. The filtering and recycling system of claim 3, further comprising a stop portion, and an end of the stop portion being fixed to the filtering tank, and another end of the stop portion being extended towards the bottom of the filtering tank and maintained an interval from the bottom of the filtering tank.

5. The filtering and recycling system of claim 4, further comprising a water storage tank connected to the overflow vent for receiving the cooling water from the overflow vent.

6. The filtering and recycling system of claim 5, further comprising a motor device connected to the water storage tank for introducing the cooling water from the water storage tank into the water intake pipe.

7. The filtering and recycling system of claim 6, further comprising a purifier installed between the overflow vent and the water storage tank for removing impurities in the cooling water flowing through the purifier.

8. The filtering and recycling system of claim 6, further comprising a purifier, installed between the water storage tank and the motor device for removing impurities in the cooling water flowing through the purifier.

9. The filtering and recycling system of claim 6, further comprising a purifier installed between the motor device and the gas filter pipe for removing impurities in the cooling water flowing through the purifier.

* * * * *